US011873466B2

(12) United States Patent
Piorkowski et al.

(10) Patent No.: US 11,873,466 B2
(45) Date of Patent: Jan. 16, 2024

(54) OPACIFIED LIQUID DETERGENT COMPOSITION COMPRISING A FATTY ACID/CALCIUM SALT MIXTURE

(71) Applicant: Henkel AG & Co. KGaA, Duesseldorf (DE)

(72) Inventors: Daniel Thomas Piorkowski, Fairfield, CT (US); Peter Schmiedel, Duesseldorf (DE); Frank Meier, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 458 days.

(21) Appl. No.: 16/949,431

(22) Filed: Oct. 29, 2020

(65) Prior Publication Data

US 2022/0135912 A1 May 5, 2022

(51) Int. Cl.

| | |
|---|---|
| ***C11D 3/04*** | (2006.01) |
| ***C11D 10/04*** | (2006.01) |
| ***C11D 9/00*** | (2006.01) |
| ***C11D 9/44*** | (2006.01) |
| ***C11D 3/50*** | (2006.01) |
| ***C11D 17/00*** | (2006.01) |
| ***C11D 1/831*** | (2006.01) |
| *C11D 1/72* | (2006.01) |
| *C11D 1/22* | (2006.01) |

(52) U.S. Cl.

CPC ............ *C11D 10/045* (2013.01); *C11D 1/831* (2013.01); *C11D 3/505* (2013.01); *C11D 9/002* (2013.01); *C11D 9/442* (2013.01); *C11D 17/003* (2013.01); *C11D 1/22* (2013.01); *C11D 1/721* (2013.01)

(58) Field of Classification Search

CPC ......... C11D 3/0089; C11D 3/04; C11D 3/046; C11D 1/72; C11D 3/0094; C11D 7/265

See application file for complete search history.

(56) References Cited

U.S. PATENT DOCUMENTS 5,269,960 A * 12/1993 Gray ........................ C11D 3/43 510/303
5,990,066 A 11/1999 Gordon et al.
9,023,786 B2 5/2015 Schmiedel et al.
2011/0220536 A1* 9/2011 Fernandez-Prieto ........................ C07C 271/22 510/303
2011/0220537 A1* 9/2011 Fernandez-Prieto ........................ C07C 237/22 510/303
2015/0210957 A1* 7/2015 Napolitano ........ C11D 17/0026 510/435
2018/0320108 A1* 11/2018 Boutique ................. C11D 3/43
2019/0112561 A1* 4/2019 Miracle .................. C11D 7/261
2020/0248102 A1* 8/2020 Scheibel .............. C11D 17/043
2020/0283705 A1* 9/2020 Smets .................... C11D 3/505
2021/0230508 A1* 7/2021 Wildemuth ......... C11D 11/0017

FOREIGN PATENT DOCUMENTS

EP 3517596 A1 7/2019
WO 95/33025 * 12/1995
WO 9533025 A1 12/1995

OTHER PUBLICATIONS

PCT International Search Report PCT/US2021/057117 Completed: Feb. 17, 2022; dated Feb. 18, 2022 3 pages.

* cited by examiner

*Primary Examiner* — Charles I Boyer

(74) *Attorney, Agent, or Firm* — Bojuan Deng

(57) ABSTRACT

An opacified liquid detergent composition includes at least one anionic surfactant, a fatty acid, calcium cations, and water. The fatty acid and calcium cations are present in the opacified liquid detergent composition in a weight ratio of the fatty acid to the calcium cations of from about 1:25 to about 1:150. The opacified liquid detergent composition is free of a microplastic opacifier and has a turbidity value of greater than 250 NTU measured utilizing a turbidity meter at about 24° C.

13 Claims, 1 Drawing Sheet

Sample 7 Sample 8

OPACIFIED LIQUID DETERGENT COMPOSITION COMPRISING A FATTY ACID/CALCIUM SALT MIXTURE

FIELD OF THE INVENTION

The present disclosure relates generally to liquid detergent compositions and, more particularly, to an opacified liquid detergent composition that is free of a microplastic opacifier.

BACKGROUND OF THE INVENTION

Liquid detergent compositions including laundry and dishwasher liquid detergents often utilize opacifiers to enhance the aesthetic and/or textural appearance of the liquid detergent. For example, many liquid detergents include ACUSOL™ OP301, a microplastic opacifier available from The Dow Chemical Company to provide a "milky" or "lotionized" appearance to the liquid detergent. Although suitable for their intended use, microplastic opacifiers do not degrade well.

Efforts have been made to formulate opacified liquid detergent compositions including biodegradable components. However, achieving both suitable opacification and structural stability of the liquid detergent composition has been a challenge. The present disclosure is aimed at solving this issue.

BRIEF SUMMARY OF THE INVENTION

The present disclosure provides an opacified liquid detergent composition comprising at least one anionic surfactant, a fatty acid, calcium cations, and water, wherein the fatty acid, the and the calcium cations are present in the opacified liquid detergent composition in a weight ratio of the calcium cations to the fatty acid of from about 1:25 to about 1:150. The opacified liquid detergent composition is free of a microplastic opacifier and has a turbidity value of greater than 250 NTU measured utilizing a turbidity meter at about 24° C.

BRIEF DESCRIPTION OF THE DRAWINGS

The advantages of the present disclosure will be readily appreciated as the same becomes better understood by reference to the following detailed description when considered in connection with the accompanying drawing.

The FIGURE is a photograph of two liquid detergent compositions disposed in glass containers, with the liquid detergent compositions containing 2.25 wt % fatty acid and varying amounts of $CaCl_2$ taken after the 5 hours of cooling from 105° F. to 75° F.

DETAILED DESCRIPTION OF THE INVENTION

The following detailed description is merely exemplary in nature and is not intended to limit the opacified liquid detergent composition of the present disclosure. Furthermore, there is no intention to be bound by any theory presented in the preceding background or the following detailed description.

Embodiments of the opacified liquid detergent composition are described in detail below. As used herein, the term "detergent" refers to a substance, preparation, agent, and/or the like including a mixture of ingredients having cleansing properties. One example is a laundry detergent, which is a detergent formulated for washing or cleaning laundry. Another example is dishwashing detergent, which is a detergent formulated for washing or cleaning dishware, drinking glasses, eating or cooking utensils, etc. The detergent may be specifically formulated for use in washing and cleaning processes performed with a washing machine or for use in washing or cleaning processes performed by hand.

Additionally, an opacified liquid detergent composition refers to a liquid detergent composition that is opaque. The liquid detergent composition may have any level of opaqueness, including a slightly opaque or translucent appearance in which some (but not all) light can be transmitted through the liquid such that objects behind the liquid cannot be seen clearly, an extremely opaque appearance in which no light can be transmitted through the liquid such that no objects behind the liquid can be seen clearly, and any level of opaqueness in-between. The opacified liquid detergent composition is not transparent, where light can be transmitted through the liquid such that objects behind the liquid can be clearly seen. In various embodiments, the opacified liquid detergent composition may be described herein as having a "cloudy" or "milky" or "lotionized" appearance.

The opacified liquid detergent composition of the present disclosure includes at least one anionic surfactant, a fatty acid, and divalent cations (for example, calcium cations). As demonstrated at least in the Example section below, it was surprisingly and unexpectedly discovered that calcium cations, which is derived from a transparent material, in combination with a fatty acid present in a weight ratio of from about 1:25 to about 1:150 of calcium cations to fatty acid, suitably opacifies the liquid detergent composition in the absence of a microplastic opacifier. As demonstrated at least by the Examples below, the liquid detergent composition of the present disclosure has a turbidity value of at least about 250 Nephelometric Turbidity Units (NTUs) measured using a turbidity meter (a 2100N Laboratory Turbidimeter available from Hach Company (Loveland, CO) at 24° C. At this turbidity, the liquid detergent composition is considered to be opacified, i.e., has a cloudy, milky, or lotionized appearance. In another embodiment, the liquid detergent composition of the present disclosure has a turbidity value of at least about 2000 NTUs measured using the turbidity meter at 24° C. In a particular embodiment, the liquid detergent composition has a turbidity value of from about 2000 to about 2500 NTUs measured using the turbidity meter at 24° C. The opacified liquid detergent composition also has a viscosity of from about 80 to about 2500 cP measured utilizing a rheometer with a 40 mm geometry cone having a 1:59:49 of degree to minute to second and a truncation gap of 52 μm operated at a shear rate of about 3.2 1/s. Since the opacified liquid detergent composition is free of a microplastic opacifier, the opacified liquid detergent composition is also considered biodegradable.

Additionally, it was surprisingly and unexpectedly discovered that the fatty acid and the calcium cations present in the above-mentioned weight ratio enhances stability of the opacified liquid detergent composition over time. For example, the combination of the fatty acid and calcium cations enhances structural stability of the opacified liquid detergent composition after temperature cycling such as, e.g., heating the composition from 23° C. to 37° C. then cooling the composition back down to 23° C. In instances where the composition includes colloidal particles, the presence of the calcium cations and the fatty acid in the above-mentioned weight ratio also reduces or even prevents gravitational separation of the colloidal particles thereby maintaining the structural stability of the opacified liquid detergent composition. Yet further, an opacified and structurally stable liquid detergent composition is may be obtained without requiring any pre-mixes, heating, or additional polymers.

The foregoing benefits will become more evident in view of the detailed description of embodiments of the opacified liquid detergent composition described below and the Examples that follow.

Surfactants

The opacified liquid detergent composition includes at least one surfactant. The surfactant(s) is used in the opacified liquid detergent composition to facilitate foaming and stain removal, as well as to minimize redeposition of soils onto a fabric. The total amount of surfactant present in the opacified liquid detergent composition may, for example, from about 5 to about 50% by weight based on a total weight of the opacified liquid detergent composition. In another embodiment, the total amount of surfactant present is from about 7 to about 30% by weight based on a total weight of the opacified liquid detergent composition. In still another embodiment, the total amount of surfactant present is from about 10 to about 20% by weight based on a total weight of the opacified liquid detergent composition.

The at least one surfactant includes at least one anionic surfactant. In an embodiment, the at least one anionic surfactant is a linear alkylbenzene sulfonate (LAS). The linear alkylbenzene sulfonate is a water-soluble salt of a linear alkyl benzene sulfonate having from 8 to 22 carbon atoms of the linear alkyl group. The salt may be an alkali metal salt or an ammonium, alkylammonium, alkanolammonium salt. In an example, the linear alkylbenzene sulfonate includes an alkali metal salt of $C_{10}$-$C_{16}$ alkyl benzene sulfonic acids, such as $C_{11}$-$C_{14}$ alkyl benzene sulfonic acids. Suitable linear alkylbenzene sulfonates include sodium and potassium linear, alkylbenzene sulfonates with the average number of carbon atoms in the alkyl group being from 11 to 14. In one example, sodium $C_{11}$-$C_{14}$ linear alkylbenzene sulfonate is a suitable anionic surfactant for the structured liquid detergent composition. The anionic surfactant(s) is present in an amount of from about 1 to about 20% by weight based on a total weight of the composition. In another embodiment, the anionic surfactant(s) is present in an amount of from about 1 to about 10% by weight based on a total weight of the composition. In yet another embodiment, the anionic surfactant(s) is present in an amount of from about 1 to about 5% by weight based on a total weight of the composition.

It should be appreciated that, in certain embodiments, the opacified liquid detergent composition may include one or more other anionic surfactants in addition to the linear alkylbenzene sulfonate.

The opacified liquid detergent composition may further include at least one nonionic surfactant. In an embodiment, the nonionic surfactant is an alcohol ethoxy sulfate having the general Formula (1):

$$R_1—O—(C_2H_4O)_n—SO_3M \quad (1),$$

where $R_1$ is an alkyl group having from 8 to 22 carbon atoms, n is an integer from 1 to 20, and M is a salt-forming cation. In an embodiment, $R_1$ is an alkyl group having from 5 to 20 carbon atoms, n is an integer from 1 to 16, and M is sodium, potassium ammonium, alkylammonium, or alkanolammonium. In a particular embodiment, $R_1$ is an alkyl group having from 8 to 20 carbon atoms, n is an integer from 1 to 10, and M is sodium, potassium ammonium, alkylammonium, or alkanolammonium. In other words, the alcohol ethoxy sulfate has a backbone including from 8 to 20 carbon atoms and is ethoxylated with from 1 to 10 moles of ethylene oxide. The detergent composition may include a single alcohol ethoxy sulfate, or may include more than one alcohol ethoxy sulfate.

In another embodiment, one or more other nonionic surfactants may be used in addition to the alcohol ethoxy sulfate. Non-limiting examples of other nonionic surfactants that may suitably be used include alkoxylated alcohols, polyoxyalkylene alkyl ethers, polyoxyalkylene alkylphenyl ethers, polyoxyalkylene sorbitan fatty acid esters, polyoxyalkylene sorbitol fatty acid esters, polyalkylene glycol fatty acid esters, alkyl polyalkylene glycol fatty acid esters, polyoxyethylene polyoxypropylene alkyl ethers, polyoxyalkylene castor oils, polyoxyalkylene alkylamines, glycerol fatty acid esters, alkylglucosamides, alkylglucosides, alkylamine oxides, and combinations thereof.

In an embodiment, the nonionic surfactant is present in the opacified liquid detergent composition in an amount of from about 1 to about 30% by weight based on a total weight of the opacified liquid detergent composition. In another embodiment, the nonionic surfactant is present in the opacified liquid detergent composition in an amount of from about 5 to about 20% by weight based on a total weight of the opacified liquid detergent composition. In still another embodiment, the nonionic surfactant is present in the opacified liquid detergent composition in an amount of from about 10 to about 15% by weight based on a total weight of the opacified liquid detergent composition.

It should be appreciated that, in certain embodiments, the plurality of surfactants could also include additional surfactants, such as but not limited to, cationic surfactants, amphoteric (zwitterionic) surfactants, etc. If present, the amount of the additional surfactants present in the opacified liquid detergent composition is from about 0.1 to about 10% by weight based on a total weight of the opacified liquid detergent composition. In another embodiment, the amount of additional surfactants is from about 0.5 to about 7% by weight based on a total weight of the opacified liquid detergent composition. In yet another embodiment, the amount of additional surfactants is from about 1 to about 4% by weight based on a total weight of the opacified liquid detergent composition In other embodiments, the structured liquid detergent composition is free of additional surfactants including cationic surfactants, amphoteric (zwitterionic) surfactants, etc.

Fatty Acid

The opacified liquid detergent composition further includes a fatty acid. Suitable fatty acids have the Formula (2):

$$R_2—C(O)OH \quad (2)$$

where $R_2$ is a linear or branched aliphatic group having from 5 to 21 carbons atoms. In another embodiment, $R_2$ of Formula (2) above is a linear or branched aliphatic group having from 12 to 20 carbons atoms. In a particular embodiment, the fatty acid is obtained from palm kernel oil and has a backbone including from 12 to 20 carbon atoms. Such a fatty acid is dodecanoic acid, or may be referred to as coconut fatty acid. Alternatively, the fatty acid could be another suitable fatty acid, non-limiting examples including carboxylic acid, lauric acid, myristic acid, palmitic acid, stearic acid, topped palm kernel fatty acid, and combinations thereof. The fatty acid is present in the opacified liquid detergent composition in an amount of at least about 1.25% by weight based on a total weight of the opacified liquid detergent composition. In another embodiment, the fatty acid is present in an amount of from about 1.75 to about 7% by weight based on a total weight of the opacified liquid detergent composition. In still another embodiment, the fatty acid is present in an amount of from about 1.75 to about 3% by weight based on a total weight of the opacified liquid detergent composition.

Divalent Cations

The opacified liquid detergent composition further includes divalent cations, in particular calcium cations. The calcium cations are derived from a substantially transparent material. As used herein, the term "substantially transparent material" refers to a material that allows light to pass through so that an object behind the material can be seen. The calcium cations, in combination with at least the fatty acid, in a particular weight ratio, form crystals suspended in the liquid components of the detergent composition and gives the composition an opacified appearance. The structuring effect occurs directly after the calcium cations are added and all of the components are blended together to form the liquid detergent composition. The structuring of the opacified liquid detergent composition remains stable for at least about 1 month at 23° C. as a liquid in a bottle. In an embodiment, the calcium cations and the fatty acid are present in the opacified liquid detergent composition in a weight ratio of from about 1:25 to about 1:150 of calcium cations to fatty acid. In another embodiment, the calcium cations and the fatty acid are present in the opacified liquid detergent composition in a weight ratio of from about 1:50 to about 1:125 of calcium cations to fatty acid. In yet another embodiment, the calcium cations and the fatty acid are present in the opacified liquid detergent composition in a weight ratio of from about 1:60 to about 1:10 of calcium cations to fatty acid.

The crystals formed from the combination of the calcium cations and at least the fatty acid also impart structure to the opacified liquid detergent composition, and these crystals may be referred to as a structurant. The presence of the structurant creates a yield point, which enables inclusion of additional materials (such as colloidal materials) in the liquid detergent composition that would otherwise be unstable due, at least in part, to gravitational separation. A suitable yield point also maintains substantially even distribution of the opacity of the liquid detergent composition, and maintains suspension of the crystals in the liquid components of the liquid detergent composition. Without a suitable yield point, an uneven distribution of opacification may be evident, with parts of the composition being transparent and other parts of the composition being opacified.

The calcium cations are derived from a calcium salt selected from calcium chloride, calcium carbonate, calcium citrate, calcium lactate, calcium gluconate, calcium sulfite, calcium bisulfate, calcium sulfate, and combinations thereof. In an embodiment, the calcium cations are derived from calcium chloride. The calcium salt is present in the opacified liquid detergent composition in an amount of from about 0.01 to about 1% by weight based on a total weight of the opacified liquid detergent composition. In another embodiment, calcium salt is present in the opacified liquid detergent composition in an amount of from about 0.05 to about 0.2% by weight based on a total weight of the opacified liquid detergent composition. Additionally, the calcium cations are present in an amount of from about 0.01 to about 0.075% by weight based on a total weight of the opacified liquid detergent composition. In another embodiment, the calcium cations are present in an amount of from about 0.015 to about 0.07% by weight based on a total weight of the opacified liquid detergent composition. In still another embodiment, the calcium cations are present in an amount of from about 0.02 to about 0.070% by weight based on a total weight of the opacified liquid detergent composition. Notably, a minimum amount of about 0.01 wt % of calcium cations is required to maintain opacification stability of the liquid detergent composition after temperature cycling. It is further noted that heterogeneity of opacification after temperature cycling may, in some instances, suffer when the amount calcium cations exceed a maximum amount of 1 wt %.

Water

The opacified liquid detergent composition further includes water, such as deionized (or DI) water. The total water content of the opacified liquid detergent composition includes the DI water in addition to water from any of the individual components of the composition provided as an aqueous solution. In an embodiment, the total amount of water present in the composition is at least about 30% by weight based on a total weight of the opacified liquid detergent composition. The opacified liquid detergent composition having at least about 30% by weight of water is said to have a high water content and is most suitable for use as a liquid detergent product. In another embodiment, water is present in an amount of from about 30 to about 90% by weight based on a total weight of the liquid detergent composition. In another embodiment, water is present in an amount of from about 30 to about 85% by weight based on a total weight of the liquid detergent composition. In still another embodiment, water is present in an amount of from about 50 to about 80% by weight based on a total weight of the opacified liquid detergent composition.

Colloidal Particles

In certain embodiments, the opacified liquid detergent composition further includes colloidal particles, such as one or more encapsulated fragrances. Encapsulated fragrances are desirable in liquid detergent compositions, because encapsulated fragrances tend to keep laundered textiles fragrant for longer periods of time compared to unencapsulated fragrances or oils. Due, at least in part, to its lower density compared to the liquid detergent composition, it is typically challenging to suspend encapsulated fragrances in the liquid components of the liquid detergent composition in the absence of a structurant. As described above, crystals formed by the combination of the divalent cations and at least the fatty acid operate as a suitable structurant enabling colloidal paricles, such as encapsulated fragrances, to be suitably suspended in the liquid components of the liquid detergent composition. In an embodiment, the colloidal particles have an effective particle size of from about 0.1 to about 500 μm and a density of from about 0.8 to about 1.25 g/mL. The colloidal particles are present in an amount of from about 0.02 to about 5% by weight based on a total weight of the opacified liquid detergent composition. In another embodiment, the colloidal particles are present in an amount of from about 0.1 to about 3.5% by weight based on a total weight of the opacified liquid detergent composition. In yet another embodiment, the colloidal particles are present in an amount of from about 0.15 to about 0.5% by weight based on a total weight of the opacified liquid detergent composition.

Additives

The opacified liquid detergent composition may further include at least one additive. In an embodiment, the opacified liquid detergent composition includes a suspension polymer, such as an alkoxylated polyethyleneimine. The alkoxylated polethyleneimine may have a polyethyleneimine backbone having a weight average molecular weight from about 300 to about 10,000. The polyethyleneimine backbone may be modified by either (1) one or two alkoxylation modifications per nitrogen atom depending, at least in part, on whether the modification occurs at an internal nitrogen atom or at a terminal nitrogen atom, in the polyethyleneimine backbone, the alkoxylation modification including the replacement of a hydrogen atom by a polyalkoxylene chain having an average of about 1 to about 40 alkoxy moieties per modification with the terminal alkoxy moiety of the alkoxylation modification capped with hydrogen, a $C_1$-$C_4$ alkyl, or combinations thereof, (2) a substitution of one $C_1$-$C_4$ alkyl moiety and one or two alkoxylation modifications per nitrogen atom depending, at least in part, on whether the substitution occurs at an internal nitrogen atom or at an terminal nitrogen atom, in the polyethyleneimine backbone, the alkoxylation modification including the replacement of a hydrogen atom by a polyalkoxylene chain having an average of about 1 to about 40 alkoxy moieties per modification with the terminal alkoxy moiety capped with hydrogen, a $C_1$-$C_4$ alkyl, or combinations thereof, or (3) a combination of (1) and (2).

The alkoxylation modification of the polyethyleneimine backbone includes the replacement of a hydrogen atom by a polyalkoxylene chain having an average of about 1 to about 40 alkoxy moieties, typically from about 5 to about 20 alkoxy moieties. The alkoxy moieties are selected from ethoxy (EO), 1,2-propoxy (1,2-PO), 1,3-propoxy (1,3-PO), butoxy (BO), and combinations thereof. In some embodiments, the polyalkoxylene chain is selected from ethoxy moieties and ethoxy/propoxy block moieties. The polyalkoxylene chain may be ethoxy moieties in an average degree of from about 5 to about 15 or the polyalkoxylene chain may be ethoxy/propoxy block moieties having an average degree of ethoxylation from about 5 to about 15 and an average degree of propoxylation from about 1 to about 16.

In an embodiment, the suspension polymer is present in an amount of from about 0.01 to about 1% by weight based on a total weight of the opacified liquid detergent composition. In another embodiment, the suspension polymer is present in an amount of from about 0.01 to about 0.5% by weight based on a total weight of the opacified liquid detergent composition. In yet another embodiment, the suspension polymer is present in an amount of from about 0.1% to about 0.2% by weight based on a total weight of the opacified liquid detergent composition.

The opacified liquid detergent may further include, as an additive, at least one neutralizing agent. Non-limiting examples of suitable neutralizing agents include alkanolamines, hydroxides, and combinations thereof. In an embodiment, the alkanolamine is selected from monoethanolamine (MEA), diethanolamine, triethanolamine, isopropanolamine, and/or the like. In another embodiment, the hydroxide is selected from sodium hydroxide, potassium hydroxide, ammonium hydroxide, calcium hydroxide, and/or the like. In an embodiment, the opacified liquid detergent composition includes sodium hydroxide as one of the plurality of neutralizing agents. Sodium hydroxide is typically available as an aqueous solution including about 50% by weight of sodium hydroxide and about 50% by weight of water. It should be appreciated that the water content of the sodium hydroxide solution is taken into account when determining the total amount of water in the opacified liquid detergent composition described below. In an embodiment, neutralizing agent(s) is present in an amount of from about 1 to about 10% by weight based on a total weight of the opacified liquid detergent composition. In another embodiment, the neutralizing agent(s) is present in an amount of from about 1 to about 5% by weight based on a total weight of the opacified liquid detergent composition. In yet another embodiment, the neutralizing agent(s) is present in an amount of from about 3 to about 4% by weight based on a total weight of the opacified liquid detergent composition.

As another additive, the opacified liquid detergent composition may include an optical brightener. The optical brightener is often responsible for the brighter, whiter, and/or cleaner appearance of laundered textiles. Suitable optical brighteners include stilbenes, distyrylbiphenyl derivatives, stilbene/naphthotriazole blends, oxazole derivatives, and/or coumarin brighteners. In an embodiment, if present, the opacified liquid detergent composition includes from about 0.01 to about 1% by weight of the optical brightener based on a total weight of the opacified liquid detergent composition. In another embodiment, the opacified liquid detergent composition includes from about 0.01 to about 0.5% by weight of the optical brightener based on a total weight of the opacified liquid detergent composition. In yet another embodiment, the opacified liquid detergent composition includes from about 0.1 to about 0.2% by weight of the optical brightener based on a total weight of the opacified liquid detergent composition.

The composition may further include, as an additive, one or more enzymes. The enzymes may be chosen amylolytic, proteolytic, cellulolytic, and/or lipolytic-type enzymes. Other suitable enzymes include, but are not limited to, proteases, amylases, lipases, and cellulases such as bacterial proteases and protein-engineered variants thereof, fungal lipases and protein-engineered variants thereof, bacterial amylases, fungal enzymes, monocomponent cellulases, and/or the like. Blends of two or more enzymes may also be used, such as a protease/lipase blend, a protease/amylase blend, a protease/amylase/lipase blend, etc. In an embodiment, if present, the opacified liquid detergent composition includes from about 0.01 to about 1% by weight of at least one enzyme based on a total weight of the opacified liquid detergent composition. In another embodiment, the opacified liquid detergent composition includes from about 0.1 to about 0.5% by weight of at least one enzyme based on a total weight of the opacified liquid detergent composition. In yet another embodiment, the opacified liquid detergent composition includes from about 0.2 to about 0.4% by weight of at least one enzyme based on a total weight of the opacified liquid detergent composition.

Colorants may also be used, as additives, in the composition. Colorants suitable for use in the structured liquid detergent composition include dyes of a variety of different colors, such as blue, yellow, green, orange, green, purple, etc. Suitable dyes include, but are not limited to, chromophore types such as azo, anthraquinone, triarylmethane, methine quinophthalone, azine, oxazine, and thiazine which may be of any desired color, hue or shade. In an embodiment, if present, the opacified liquid detergent composition includes from about 0.1 to about 5% by weight of the colorant based on a total weight of the opacified liquid detergent composition. In another embodiment, the opacified liquid detergent composition includes from about 0.1 to about 3% by weight of the colorant based on a total weight of the opacified liquid detergent composition. In yet another embodiment, the opacified liquid detergent composition includes from about 1 to about 2% by weight of the colorant based on a total weight of the opacified liquid detergent composition.

The opacified liquid detergent composition may further includes, as an additive, at least one chelator for removing undissolved minerals from the liquid detergent composition to reduce discoloration of the textiles caused by the minerals. A non-limiting example of a suitable chelator is tetrasodium iminodisuccinate (IDS). Another non-limiting example of a suitable chelator is citric acid. In an embodiment, the chelator is present in an amount of from about 0.01 to about 10% by weight based on a total weight of the opacified liquid detergent composition. In another embodiment, the chelator is present in an amount of from about 0.5 to about 7% by weight based on a total weight of the opacified liquid detergent composition. In still another embodiment, the chelator is present in an amount of from about 0.5 to about 6% by weight based on a total weight of the opacified liquid detergent composition.

The opacified liquid detergent composition may further, as other additives, bittering agents (such as denatonium benzoate, aloin, and/or the like), oxygen scavengers (such as sodium sulfite), antifoaming agents (such as a polyalkoxylated alkanolamide, amide, amine oxide, betaine, sultaine, $C_8$-$C_{18}$ fatty alcohols, those derived from phenylpropylmethyl substituted polysiloxanes, and/or the like), auxiliary foam stabilizing surfactants (such as a fatty acid amide surfactant including $C_8$-$C_{20}$ alkanol amides, monoethanolamides, diethanolamides, isopropanolamides, and/or the like), dye transfer inhibitors (such as homopolymers and copolymers of vinylpyrrolidone and vinylimidazole), soil release agents (such as a nonionic polyester of polypropylene terephthalate, a polyethylene glycol polyester, end-capped and non-end-capped sulfonated and unsulfonated PET/POET polymers, polyethylene glycol/polyvinyl alcohol graft copolymers, and/or anionic hydrophobic polysaccharides), antimicrobial agents (such as antimicrobials, germicides, and/or fungicides), and combinations thereof.

The following examples are meant to illustrate the invention and are not to be viewed in any way as limiting the scope of the present claims.

EXAMPLES

Example 1

Eight samples of a liquid detergent composition were prepared. Four of the compositions (Samples 1-4) were prepared including 0.5% by weight of coconut fatty acid based on a total weight of the liquid detergent composition, and are set forth in Table 1 below. Sample 1 was free of calcium chloride. Samples 2-4 included varying amounts of calcium chloride.

TABLE 1

Liquid Detergent Compositions including 0.5 wt % coconut fatty acid

| Sample | Actives (%) | 1 (wt %) | 2 (wt %) | 3 (wt %) | 4 (wt %) |
|---|---|---|---|---|---|
| Nonionic Surfactant | 100 | 13.47 | 13.47 | 13.47 | 13.47 |
| Neutralizing Agent | 50 | 3.87 | 3.87 | 3.87 | 3.87 |
| Optical Brightener | 68 | 0.13 | 0.13 | 0.13 | 0.13 |
| Anionic Surfactant | 96 | 1.82 | 1.82 | 1.82 | 1.82 |
| Fatty Acid | 100 | 0.5 | 0.5 | 0.5 | 0.5 |
| Amphoteric Surfactant | 37.5 | 2 | 2 | 2 | 2 |
| Polymer | 45 | 0.17 | 0.17 | 0.17 | 0.17 |
| Chelators | 34 | 0.96 | 0.96 | 0.96 | 0.96 |
| Colorant | 1 | 1.5 | 1.5 | 1.5 | 1.5 |
| Preservative | 100 | 0.06 | 0.06 | 0.06 | 0.06 |

TABLE 1-continued

Liquid Detergent Compositions including 0.5 wt % coconut fatty acid

| Sample | Actives (%) | 1 (wt %) | 2 (wt %) | 3 (wt %) | 4 (wt %) |
|---|---|---|---|---|---|
| Enzymes | 100 | 0.3 | 0.3 | 0.3 | 0.3 |
| Calcium Chloride | 100 | 0 | 0.05 | 0.1 | 0.2 |
| Q.S. Water | 100 | 75.22 | 75.17 | 75.12 | 75.02 |
| Total | 100 | 100 | 100 | 100 | 100 |

Compositions of the remaining four samples (Samples 5-8) are set forth in Table 2 below. Each of these samples were prepared including 2.25% by weight of coconut fatty acid based on a total weight of the liquid detergent composition. Sample 5 was free of calcium chloride. Samples 6-8 include varying amounts of calcium chloride. Notably, Sample 8 is an opacified liquid detergent composition representative of the present disclosure.

TABLE 2

Liquid Detergent Compositions including 2.25 wt % coconut fatty acid

| Sample | Actives (%) | 5 | 6 | 7 | 8 |
|---|---|---|---|---|---|
| Nonionic Surfactant | 100 | 13.47 | 13.47 | 13.47 | 13.47 |
| Neutralizing Agent | 50 | 4.4 | 4.4 | 4.4 | 4.4 |
| Optical Brightener | 68 | 0.13 | 0.13 | 0.13 | 0.13 |
| Anionic Surfactant | 96 | 1.82 | 1.82 | 1.82 | 1.82 |
| Fatty Acid | 100 | 2.25 | 2.25 | 2.25 | 2.25 |
| Amphoteric Surfactant | 37.5 | 2.0 | 2.0 | 2.0 | 2.0 |
| Polymer | 45 | 0.17 | 0.17 | 0.17 | 0.17 |
| Chelators | 34 | 0.96 | 0.96 | 0.96 | 0.96 |
| Colorant | 1 | 1.5 | 1.5 | 1.5 | 1.5 |
| Preservative | 100 | 0.06 | 0.06 | 0.06 | 0.06 |
| Enzymes | 100 | 0.3 | 0.3 | 0.3 | 0.3 |
| Calcium Chloride | 100 | 0 | 0.05 | 0.1 | 0.2 |
| Q.S. Water | 100 | 72.94 | 72.89 | 72.84 | 72.74 |
| Total | 100 | 100 | 100 | 100 | 100 |

Each of the liquid detergent compositions of Samples 1-8 were batched and then evaluated to determine the viscosity (cP) at 20° C. using an AR2000-EX Rheometer, available from TA Instruments (New Castle, DE) at a shear rate of 3.2 1/s with a geometry cone of 40 mm, 1:59:49 degree:min:sec, and a truncation gap of 52 µm. The results of the viscosity measurement are summarized in Table 3 below.

The turbidity value of each of the Samples 1-8 was measured in Nephelometric Turbidity Units (NTU) at 24° C. (75° F.) using a 2100N Laboratory Turbidimeter available from Hach Company (Loveland, CO). The turbidimeter operates by comparing how light is scattered in a sample against the amount of light scattered in a reference solution. A turbidity value under 10 NTU is considered transparent, and a turbidity value above 10 NTU is considered cloudy. Liquid detergent compositions having a turbidity value of at least about 250 NTU are considered sufficiently opacified. The results of the turbidity test are also summarized in Table 3 below.

Separation index of Samples 1-8 was also measured to determine a 15-week stability of the Samples 1-8 utilizing a LUMiSizer 12-channel dispersion analyzer, available from LUM GmbH (Berlin, Germany). In particular, the separation index is used to determine the amount of separation that would occur after 2550 hours (about 106 days or 15 weeks)

at 25° C. at 1 g-force (standard room temperature stability). In this test, about 0.4 mL of each of Samples 1-8 was disposed in 2 mm polyamide synthetic cells and spun at 855 g-force for about 3 hours at a Light Factor of 1 at 25° C. The separation index of each of Samples 1-8 was determined utilizing SEPview® 6 software available from LUM GmbH by reading the sample cell between 115.2 mm and 129.7 mm. The separation indices range from 1 to 1.0, with 0 signifying 0% separation (complete stability) and 1.0 signifying 100% separation.

In addition, Samples 7 and 8 were placed into glass jars and tested for stability at 75° F. after three days. Samples 1-6 were not tested for stability, as none of these compositions exhibited desirable turbidity.

TABLE 3

Results of Turbidity, Viscosity, Separation Index, and Temperature Cycling Stability Tests on Samples 1-8

| Sample | Fatty Acid (wt %) | $CaCl_2$ (wt %) | Turbidity (NTU) | Turbidity Acceptable? | Viscosity (cP) | Sep. Index | Stability |
|---|---|---|---|---|---|---|---|
| 1 | 0.5 | 0 | 2.7 | No | 255 | N/A | N/A |
| 2 | 0.5 | 0.05 | 3.1 | No | 275 | N/A | N/A |
| 3 | 0.5 | 0.1 | 2.8 | No | 265 | N/A | N/A |
| 4 | 0.5 | 0.2 | 4.2 | No | 250 | N/A | N/A |
| 5 | 2.25 | 0 | 3.2 | No | 260 | N/A | N/A |
| 6 | 2.25 | 0.05 | 2.9 | No | 255 | N/A | N/A |
| 7 | 2.25 | 0.1 | 185 | Yes | 270 | 0.26 | No |
| 8 | 2.25 | 0.2 | 2050 | Yes | 600 | 0.003 | Yes |

The results summarized in Table 3 above show that none of the compositions containing 0.5 wt % fatty acid (Samples 1-4) achieved opacification, as the turbidity values were less than 10 NTU. However, Samples 7 and 8 containing 2.25 wt % fatty acid and 0.1% calcium chloride (Sample 7) and 0.2 wt % calcium chloride (Sample 8) achieved turbidity values above 10 NTU, indicating the presence of opacification. Sample 8, an example representative of the present disclosure, achieved a turbidity value above 2000 NTU, indicating suitable opacification for a liquid detergent composition. These results indicate a minimal amount of fatty acid of greater than 0.5 wt % and a minimal amount of 0.1 wt % calcium chloride is required to achieve the desirably suitable opacification. In addition, based on the measured separation indices, the composition of Sample 8 achieved desirable separation stability at 24° C. (room temperature) after 24 hours. Thus, these results indicate that liquid detergent compositions containing calcium cations and fatty acid present in a particular weight ratio range achieve suitable opacification and stability.

In addition, Samples 7 and 8 above were tested for temperature cycling stability. Each of Samples 7 and 8 was placed into two glass jars, with one placed in a chamber at 105° F. (about 41° C.) and the other placed in a chamber at 125° F. (about 52° C.). After 24 hours, each of the Samples 7 and 8 were transparent at both 105° F. and 125° F. temperature chambers. Then Samples 7 and 8 were removed from the chambers and allowed to cool to 75° F. (about 24° C.). The temperature cycling stability of each of the Samples 7 and 8 were observed by visual inspection. The FIGURE is photograph of Samples 7 and 8 disposed in glass containers taken after the 5 hours of cooling from 105° F. to 75° F. After the five hours of cooling, Sample 7 was observed to be translucent while Sample 8 regained turbidity. These results indicate suitable temperature cycling stability of Sample 8.

As used herein, the article "a," "an," and "the" can be used herein to refer to one or more than one (i.e., to at least one) of the grammatical object of the article unless the language and/or context clearly indicates otherwise.

As used herein, the term "about" is understood by persons of ordinary skill in the art and varies to some extent depending upon the context in which the term is used. If there are uses of the term which are not clear to persons of ordinary skill in the art, given the context in which the term is used, "about" means up to plus or minus 10% of the particular term.

It is to be understood that one or more values described above may vary by +/−5%, +/−10%, +/−15%, +/−20%, etc. so long as the variance remains within the scope of the present disclosure. It is also to be understood that the appended claims are not limited to express particular compounds, compositions, or methods described in the detailed description, which may vary between particular embodiments which fall within the scope of the appended claims.

It is also to be understood that any ranges or subranges relied upon in describing the various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. Additionally, an individual number within a disclosed range may be relied upon and provides adequate support for specific embodiments within the scope of the appended claims. For example, a range "of from about 100 to about 200" includes various individual integers such as 101, 102, 103, etc., as well as individual numbers including a decimal point (or fraction) such as 100.1, 100.2, etc., which may be relied upon and provide adequate support for specific embodiments within the scope of the appended claims.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. An opacified liquid detergent composition comprising:

at least one anionic surfactant;

a fatty acid present in an amount about 1.75% to about 3% by weight of the total composition;

calcium chloride present in an amount of at least 0.2% by weight of the total composition; and water, wherein said calcium chloride and said fatty acid are present in said opacified liquid detergent composition in a weight ratio of said calcium chloride to said fatty acid of from about 1:10 to about 1:30, wherein said opacified liquid detergent composition is free of a microplastic opacifier, wherein said opacified liquid detergent composition has a turbidity value of at least about 2000 NTU measured utilizing a turbidity meter at about 24° C., and wherein said opacified liquid detergent composition remains structurally stable for at least about 1 month at 23° C.

2. The opacified liquid detergent composition as set forth in claim 1, wherein said calcium chloride is derived from a transparent material.

3. The opacified liquid detergent composition as set forth in claim 1, wherein said calcium chloride is present in an amount of from about 0.2% to about 1% by weight based on a total weight of said opacified liquid detergent composition.

4. The opacified liquid detergent composition as set forth in claim 1, wherein said fatty acid is present in an amount of about 2.25% by weight based on a total weight of said opacified liquid detergent composition.

5. The opacified liquid detergent composition as set forth in claim 1, wherein said water is present in an amount of from about 30 to about 90% by weight based on a total weight of said opacified liquid detergent composition.

6. The opacified liquid detergent composition as set forth in claim 1, further comprising colloidal particles present in an amount of from about 0.02 to about 1% by weight based on a total weight of said opacified liquid detergent composition.

7. The opacified liquid detergent composition as set forth in claim 1, wherein said colloidal particles are an encapsulated fragrance.

8. The opacified liquid detergent composition as set forth in claim 1, wherein said at least one anionic surfactant is a linear alkylbenzene sulfonate.

9. The opacified liquid detergent composition as set forth in claim 1, further comprising at least one nonionic surfactant.

10. The opacified liquid detergent composition as set forth in claim 9, wherein the nonionic surfactant is an alcohol ethoxylate having a backbone including from 8 to 20 carbon atoms and ethoxylated with from about 1 to about 10 moles of ethylene oxide.

11. The opacified liquid detergent composition as set forth in claim 1, wherein said fatty acid is obtained from palm kernel oil and has a backbone including from 12 to 20 carbon atoms.

12. The opacified liquid detergent composition as set forth in claim 1, wherein said opacified liquid detergent composition has a viscosity of from about 80 to about 2500 cP measured utilizing a rheometer with a 40 mm geometry cone having a 1:59:49 of degree to minute to second and a truncation gap of 52 μm operated at a shear rate of about 3.2 1/s.

13. The opacified liquid detergent composition as set forth in claim 1, wherein said calcium chloride and said fatty acid are present in said opacified liquid detergent composition in a weight ratio of said calcium chloride to said fatty acid of from about 1:10 to about 1:20 of calcium chloride to fatty acid.

* * * * *